June 10, 1958  F. W. KOCHER  2,837,876
TREATING GLASS SHEETS
Filed June 3, 1957  4 Sheets-Sheet 3

INVENTOR.
FRED W. KOCHER
BY Oscar L. Spencer
HIS ATTORNEY

2,837,876
Patented June 10, 1958

2,837,876

TREATING GLASS SHEETS

Fred W. Kocher, Festus, Mo., assignor to Pittsburgh Plate Glass Company, Allegheny County, Pa., a corporation of Pennsylvania Application June 3, 1957, Serial No. 663,037

5 Claims. (Cl. 51—140)

The present invention concerns treating glass sheets, and more specifically refers to apparatus for seaming the edges of glass sheet doublets precut to their ultimate outline.

In producing laminated automobile windshields, pairs of glass sheets are cut to matching outlines, washed, dried, and stacked in pairs on a bending mold for transport through a tunnel-like lehr where the glass is bent to a desired shape. After bending, the bent sheets are separated and a sheet of thermoplastic material is inserted as an interlayer between the glass sheets to form a curved glass-plastic sandwich. The latter assembly is laminated to form the ultimate product which is installed in an automobile frame to serve as a windshield.

Unless the edges of the cut glass sheets are seamed, the edges of the glass sheets remain so sharp that operating personnel and customers handling the sheets are likely to be cut. Seaming by moving an abrasive surface against the edge of the precut sheets has been found to eliminate these sharp edges. The present invention is concerned with improved apparatus for effecting such seaming.

In a typical embodiment of the present invention, an edge seaming apparatus is provided for use along a horizontal line for conveying matched glass sheets along parallel paths from a cutting station to a washing station. Such typical apparatus includes an overhead track extending transversely above the horizontal conveyor normally employed for transporting matched glass sheets along spaced parallel paths, a pair of carriages mounted for movement along the overhead track, a brake for setting the position for each carriage along the overhead track, a pulley system pivoted to each carriage, each pulley system comprising a driving pulley, a driven pulley, and an abrasive belt traversing the horizontal plane of the conveyor and interconnected between the pulleys. The pulley systems are counterweighted to lightly urge each abrasive belt into continuous engagement with a longitudinally extending edge of one of the glass sheets moving along one of the parallel paths in opposition to the other abrasive belt carried by the other pulley system suspended in pivoted relationship from the other carriage of the pair. Each pulley system is also provided with freely rotatable guide rolls which flank glass engaging run of the abrasive belt to contact the edge of the moving glass sheets thus preventing over grinding of the edges of the glass sheets. Also, stop members prevent the pulley systems from rotating into abutment with each other.

An additional overhead rail may be included for an additional pair of support carriages for servicing the path traversed by the other sheet of each matched pair of sheets. Also, pinch rolls are included near each seaming station to impart a positive drive to the glass sheets passing therethrough and to keep them aligned with their desired paths of movement.

A typical embodiment of the present invention will be described for purposes of illustration rather than limitation. In the drawings which form part of the description of this embodiment and wherein like reference numerals refer to like structural elements, Figure 1 represents an end elevation of a portion of a horizontal conveyor equipped with a typical embodiment of edge seaming apparatus according to the present invention.

Figure 1:
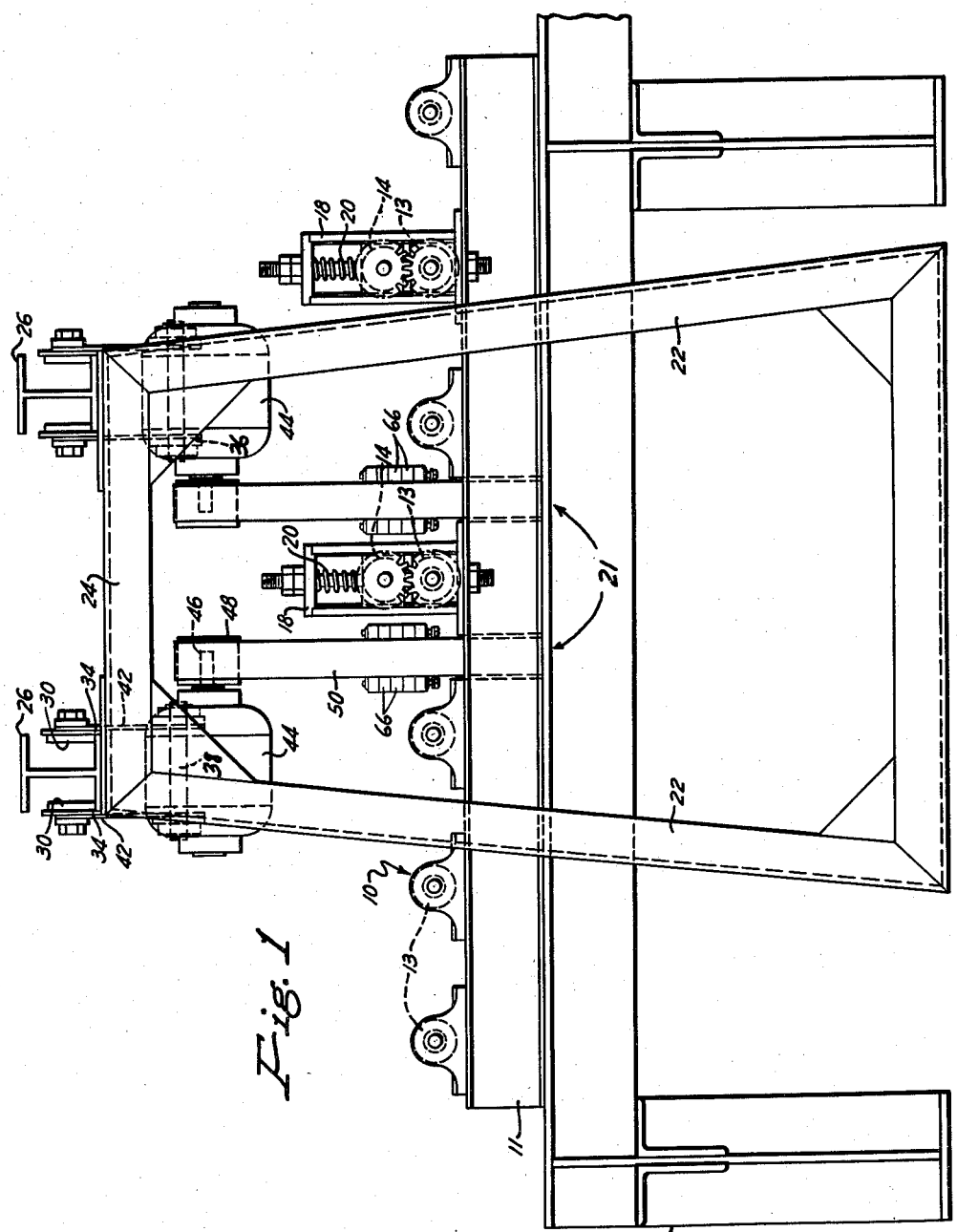
Figure 2:
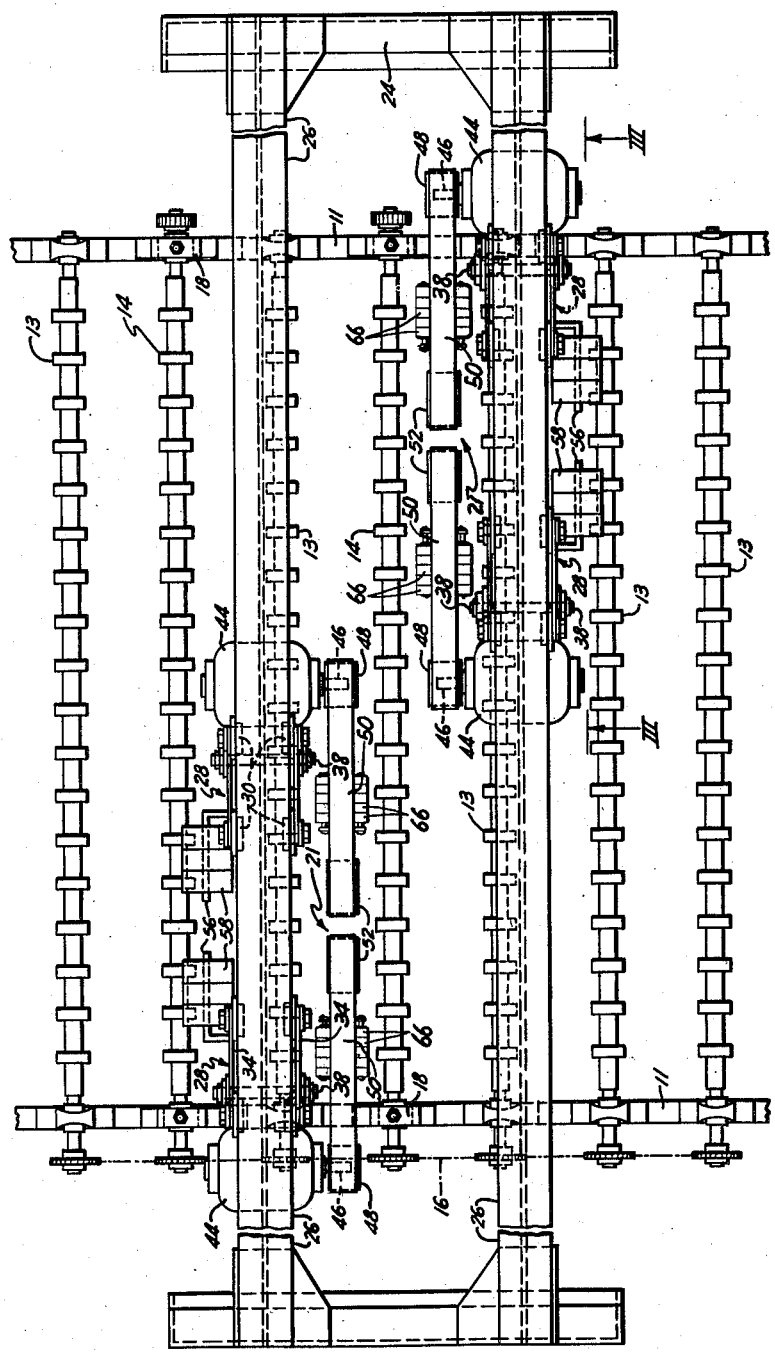
Figure 2 is a plan view of the portion of the conveyor of Figure 1 showing the edge seaming apparatus in plan.

Referring to the drawings, a horizontal conveyor shown generally by reference number 10 is supported on longitudinally extending horizontal beams 11 carried by a support structure 12 which includes flange beams and pillars. The horizontal conveyor includes conveyor rolls 13 and pinch rolls 14. The conveyor rolls are driven by means of a drive 16 coupled to a motor (not shown). The pinch rolls 14 are arranged in vertical relation to certain conveyor rolls 13 within pinch roll housings 18. Pinch rolls 14 are adjustable toward their vertically aligned conveyor rolls 13 by means of control adjustments 20.

The seaming apparatus 21 is supported on braces 22 interconnected by interconnecting beams 24 extending longitudinally of the conveyor. I-beams 26 extend transversely above the conveyor and interconnect the longitudinally extending interconnecting beams 24. Carriages 28 are mounted in pairs in movable relation to the bottom flange 29 of the I-beams 26. The carriages include wheels 30, which roll along the upper surfaces of the bottom flanges 29. Each carriage includes a brake lever 32 for fixing the carriage in position relative to the I-beam which serves as a track for movement of the carriages. Each carriage 28 also includes vertical carriage plates 34 spaced by spacer members 31. Bearing housings 36 carrying a bearing rod 38 therebetween are supported on the carriage plates 34. The bearing rod 38 is fixed to a pulley assembly 40.

The means by which the pulley assembly 40 is attached to the bearing rod 38 includes a pair of brackets 42 for supporting a motor 44. The latter drives a drive shaft 46 which rotates a drive pulley 48, which in turn moves an abrasive belt 50 attached at its other end to a driven pulley 52. The pulleys are maintained in spaced relation by means of a belt tightener 54.

The entire pulley assembly hinges about the bearing rod 38 carried by the bearing housing 36 and is preferably counterweighted by means of a lever arm 56 carrying a counterweight 58 to decelerate the rate that the pulley assembly pivots about the pivot bearing rod 38.

In addition, a stop bar 60 is carried for engagement with a stop flange 62 carried by each carriage plate 34 to prevent the pulley assemblies 40 from rotating into a position where the driven pulleys 52 are at the level of the horizontal conveyor. In other words, the stop bars 60 cooperate with stop flanges 62 to keep the driven pulleys below the conveyor, thus allowing the abrasive belts to intersect the path of movement of the opposite longitudinal edges of the glass sheets.

In order to prevent excess seaming along a longitudinal edge of a glass sheet, guide rolls 66 are mounted for free rotation about bearing rods 68 fixed to a bracket 70 attached to each belt tightener 54. Stops 72 in the form of washers or cotter pins are provided to keep the guide rolls 66 from sliding off the rods 68.

Figure 3:
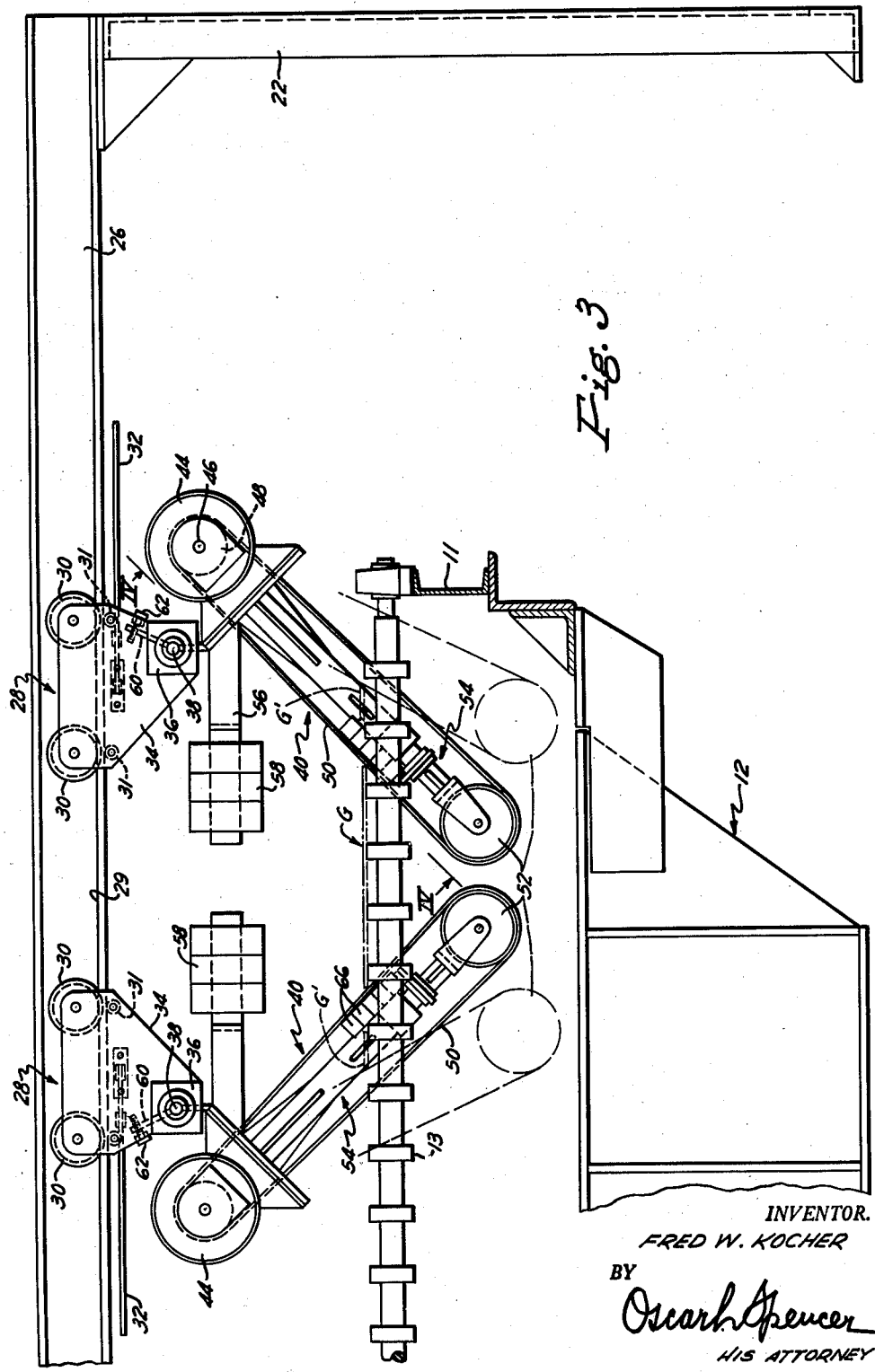
Figure 3 is a partial transverse elevation looking along the lines III—III of Figure 2, showing a glass sheet being seamed simultaneously along its opposite longitudinal sides as it passes through the seaming apparatus and also showing the relative location of parts in phantom as a wider portion of the glass sheet passes through the apparatus.
Figure 4:
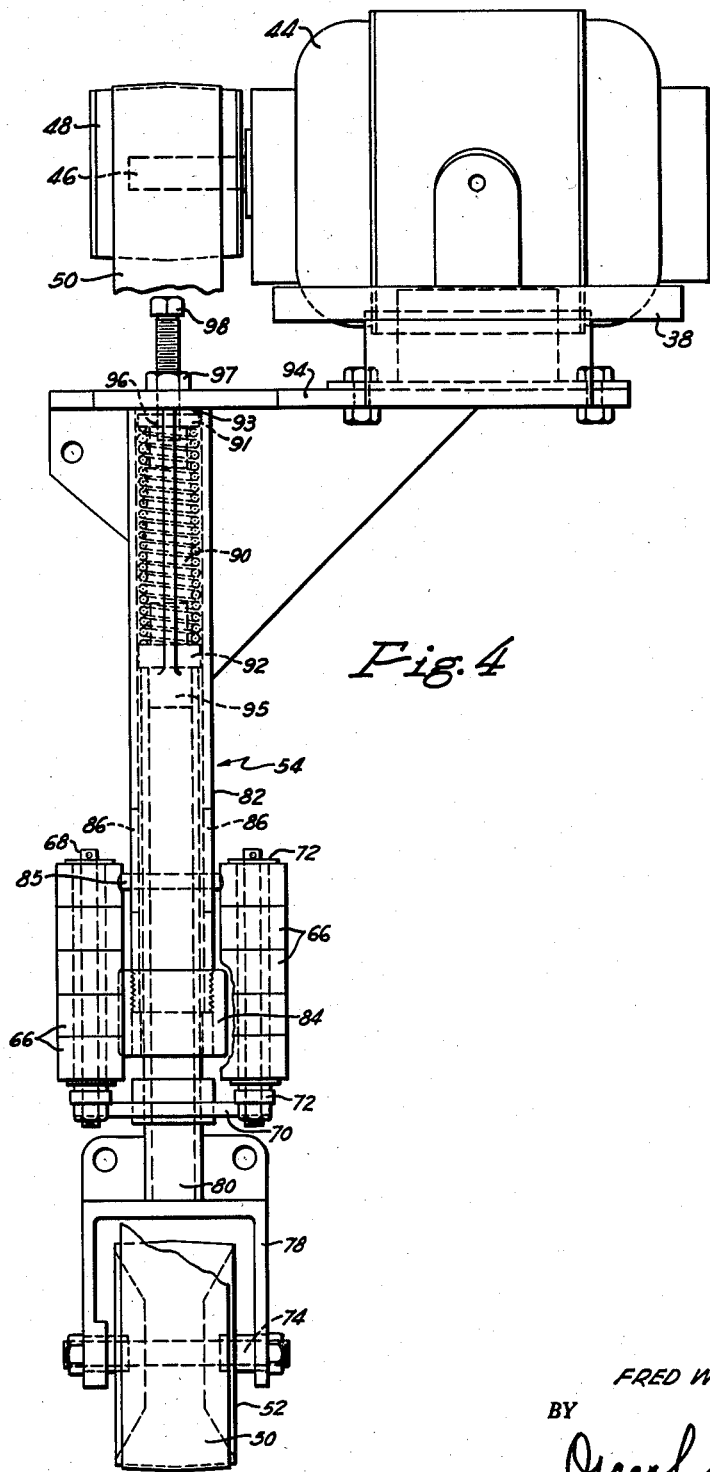
Figure 4 is an enlarged detailed view taken along the lines IV—IV of Figure 3.

It will be noted from Figures 3 and 4 that the guide rolls 66 are located to intersect the horizontal support plane of the conveyor intermediate the tangential planes common to the driving and driven pulleys and to flank the glass edge engaging run of the abrasive belt 50. Thus, the longitudinal side edges of the glass sheets contact the guide rolls 66 before the abrasive belts 50 contact the glass, thus tending to separate the pulley assemblies 40 from each other and minimizing frictional belt wear.

The belt tightener 54 prevents too much slack for the abrasive belt 50 by insuring that the driven pulley 52 is maintained a maximum distance from the driving pulley 48. This is accomplished by the following structure. Driven pulley 52 is mounted on a bearing rod 74 carried by a yoke 78. The latter in turn is fastened to a bottom of a tube 80, the upper portion of which is surrounded by a sleeve 82. A bearing collar 84 surrounds the bottom of sleeve 82. A pin 85 is fixed across and through the tube 80 and is vertically movable in vertical slots 86 cut out of diametrically opposite portions of the sleeve 82.

Above tube 80 and within the upper portion of sleeve 82 is a spring 90. The spring 90 is compressed between an upper detent 91 and a lower detent 92. Lower detent 92 abuts the top of tube 80 and extends into a plug 95 that fits within the latter. Upper detent 91 is downwardly adjustable from an upmost position contacting bottom surface 93 of a support 94 for motor 44. The upper detent 91 is fixed to an adjustment screw 96 which is threaded through support plate 94. An adjustment nut 97 above support plate 94 helps prevent displacement of the upper detent from a predetermined position in tube 82. Screw head 98 is included to rotate adjustment screw 96 to change the setting of upper detent 91.

The tension supplied to the abrasive belt 50 by the belt tightener 54 is a function of the setting of the adjustment nut 97 and its attached detent 91. As the adjustment nut is screwed downwardly in the view of Figure 4, spring 90 is compressed by the downward movement of upper detent 91, and forces lower detent 92 to push sleeve 80 downwardly within tube 82 within limits defined by the traverse permitted for pins 85 within slots 86.

When precut glass sheets G are conveyed along the horizontal conveyor through the edging or seaming station, the adjacent pulley assemblies 40 of a pair are pivoted about their respective pivot rods 38 and so counterweighted that their lower portions are urged lightly toward each other. Thus, one run of each abrasive belt 50 is moved past a longitudinal edge as the glass sheets move between the opposing pulley assemblies. When the width of glass sheets G widens from the width depicted for glass sheet G to that depicted by G' in Figure 3, the pulley assemblies 40 are pivoted about their respective pulley axes 38 away from each other by the edges of the moving sheets acting upon the rollers 66 to separate the bottom portion of the pulley assemblies.

The orientation of the glass sheets G relative to the assemblies and the conveyor 10 is maintained because of the action of the pinch rolls 14 cooperating with their vertically aligned conveyor rolls 13 to impart a positive drive to the moving glass sheets. As the width of the glass sheet increments passing between the opposing runs of the abrasive belts 50 varies, the guide rolls 66 are forced outwardly by the widening glass to pivot the driven pulleys 52 and the glass edge engaging run of belts 50 away from each other. The glass sheet G behaves as a strut to separate the opposing guide rolls of the opposing pulley assemblies of the pair. Counterweighting the pulley assemblies to produce a small net turning moment into engagement with the opposite edges of the glass sheets is important to minimize sudden bumps tending to fracture the glass. The disposition of the guide rolls 66 on opposite sides of the glass engaging run of the abrasive belts 50 of each pulley assembly 40 limits belt tensioning, and also eliminates excess edging of the longitudinal surfaces of the glass sheet within the width of glass sheet specified by the separation between carriages 28 and engagement between stop bar 60 and stop flange 62.

The station for seaming the other sheet of the doublet conveyed along a path parallel to the path of the first doublet sheet seamed is offset longitudinally of the horizontal conveyor relative to the first seaming station. However, its structure and mode of operation is identical to that of the first seaming station.

The purpose of offsetting the seaming stations longitudinally is to minimize the width of conveyor required to convey the sheets lengthwise. Otherwise, the space taken up by the motor for one carriage for one longitudinal inboard extremity of one sheet of a doublet would have to be offset with respect to the motor used to drive the pulley assembly for the abrasive belt of the inboard longitudinal extremity of the other doublet sheet, thus resulting in inefficient use of space for this structure. This structure also makes possible lateral displacement of the inboard extremity seaming belt assemblies to beyond the lateral edges of the conveyor for maintenance and repair.

While a particular embodiment has been disclosed for purposes of illustration, it is understood that various modifications will become obvious in the light of the description. For example, while the pulley systems are shown as suspended from an overhead bridge, they could also be pivoted in cantilever fashion from beneath the conveyor. Also, while the motor is shown as providing the essential portion of the turning moment to pivot each pulley system toward a longitudinal edge of the glass sheets, the location of the motor may be changed relative to the pivot point to require a counterweight providing a turning moment in excess of that provided by the motor to yield a net turning moment urging the pulley system against an edge of the glass sheets.

I claim:

1. In apparatus for edge seaming curved longitudinal edges of flat glass sheets having varying widths comprising a horizontal conveyor for transporting flat glass sheets therealong, a seaming station comprising a track extending transversely in spaced relation to said conveyor, a pair of carriages mounted along said track for location in predetermined positions therealong, a pulley system pivoted to each carriage, each pulley system comprising a driving pulley, a driven pulley, an abrasive belt traversing the horizontal plane of the conveyor and interconnected between said pulleys, means to balance each pulley system to cause the abrasive belts to pivot slowly into engagement with the path traversed by the opposite longitudinal edges of glass sheets conveyed past the seaming station, freely rotatable guide rolls intersecting the plane of the conveyor and located intermediate the tangential planes common to the driving and driven pulleys and beyond the lateral edges of the abrasive belt to limit the minimum spacing between opposing pairs of abrasive belts at the plane of the conveyor to the width of the increment of glass sheet passing therethrough, and means to drive each pulley system.

2. Apparatus as in claim 1, wherein the horizontal conveyor is of a width sufficient to transport precut glass sheets longitudinally along spaced, parallel paths and including a pair of tracks spaced longitudinally of the conveyor, a pair of carriages disposed relative to one track so that their supported pulley systems are pivotable to enable their abrasive belts to intersect the longitudinal edges of the sheets moving along one of the parallel paths and another pair of carriages are disposed relative to the other track so that their supported pulley systems are pivotable to enable their abrasive belts to intersect the longitudinal edges of the sheets moving along the other parallel path.

3. Apparatus as in claim 1, including pinch rolls located along the horizontal conveyor adjacent the seaming station to impart a positive drive to glass sheets moving therethrough.

4. Apparatus as in claim 1, wherein the tracks are mounted above and spaced from the horizontal conveyor.

5. Apparatus as in claim 1, including a belt tightener disposed between the driving and driven pulley.

No references cited.